US012018631B1

(12) United States Patent
Haring

(10) Patent No.: US 12,018,631 B1
(45) Date of Patent: Jun. 25, 2024

(54) ENHANCED CONTROL OF HYDROGEN INJECTION FOR INTERNAL COMBUSTION ENGINE SYSTEM AND METHOD

(71) Applicant: Christopher Haring, River Ridge, LA (US)

(72) Inventor: Christopher Haring, River Ridge, LA (US)

( * ) Notice: Subject to any disclaimer, the term of this patent is extended or adjusted under 35 U.S.C. 154(b) by 0 days.

(21) Appl. No.: 18/239,449

(22) Filed: Aug. 29, 2023

(51) Int. Cl.
*F02M 21/02* (2006.01)
*F02B 43/10* (2006.01)
(Continued)

(52) U.S. Cl.
CPC ....... *F02M 21/0206* (2013.01); *F02D 19/026* (2013.01); *F02D 41/28* (2013.01); *F02D 2200/021* (2013.01); *F02D 2200/703* (2013.01)

(58) Field of Classification Search
CPC .. F02M 21/0206; F02M 25/12; F02D 19/026; F02D 19/0644; F02D 41/28;
(Continued)

(56) References Cited

U.S. PATENT DOCUMENTS 3,906,913 A 9/1975 Rupe
3,973,524 A 8/1976 Rubin
(Continued)

FOREIGN PATENT DOCUMENTS

EP 3365542 B1 9/2021
WO WO2010084358 A2 7/2010
(Continued)

*Primary Examiner* — Grant Moubry
(74) *Attorney, Agent, or Firm* — KEATY LAW FIRM LLC; Thomas S. Keaty

(57) ABSTRACT

An enhanced control of hydrogen injection for internal combustion engine system and method providing greater real-time control of injection of hydrogen from a hydrogen generator, providing a further increase in performance and decrease in emissions of the engine of the motor vehicle. Initial values for parameters defining the optimal percentage amount or pressure of oxyhydrogen to be injected when the engine load is equal to one of several defined levels are entered and then interpolated to produce a curve specifying the amount of oxyhydrogen to be injected at any given engine-load level. Further adjustments to the load-related oxyhydrogen amounts are made for different engine operating temperatures in relation to different engine loads, and for different ambient air pressures related to altitude in relation to different engine loads. The initial values and adjusted values will be different for different engine types and sizes, different fuel types and grades, and other characteristics. The enhanced control of hydrogen injection for internal combustion engine system and method takes account of these engine-specific and operation-specific differences to provide an optimum amount of oxyhydrogen injection across a range of operating and ambient conditions. The operating conditions of engine load, rotational speed, vacuum, and engine temperature, and the ambient conditions of ambient temperature and ambient air pressure related to altitude are monitored in real time by a controller unit, which makes adjustments to cause a hydrogen injector to inject the optimum amount of oxyhydrogen into the fuel intake manifold of the engine. The controller unit also controls the operation of the hydrogen generator to provide adequate supply of oxyhydrogen and to ensure safe operations.

20 Claims, 6 Drawing Sheets

(51) Int. Cl.
*F02D 19/02* (2006.01)
*F02D 41/28* (2006.01)

(58) Field of Classification Search
CPC ........... F02D 2200/21; F02D 2200/703; F02B 43/10; F02B 43/02; F02B 2043/106
See application file for complete search history.

(56) References Cited

U.S. PATENT DOCUMENTS

| | | | |
|---|---|---|---|
| 4,031,865 | A | 6/1977 | Dufour |
| 4,033,133 | A | 7/1977 | Houseman et al. |
| 4,141,326 | A | 2/1979 | Wolber |
| 4,200,062 | A | 4/1980 | Duckworth |
| 4,389,981 | A | 6/1983 | Meyer |
| 4,393,817 | A | 7/1983 | Lindberg |
| 4,416,224 | A | 11/1983 | Hobby et al. |
| 4,478,177 | A | 10/1984 | Valdespino |
| 4,573,435 | A | 3/1986 | Shelton |
| 4,750,453 | A | 6/1988 | Valdespino |
| 5,085,176 | A | 2/1992 | Brinkley, III |
| 5,119,768 | A | 6/1992 | Russell |
| 5,152,309 | A | 10/1992 | Twerdochlib et al. |
| 5,964,089 | A | 10/1999 | Murphy et al. |
| 6,122,909 | A | 9/2000 | Murphy et al. |
| 6,155,212 | A | 12/2000 | McAlister |
| 6,257,175 | B1 | 7/2001 | Mosher et al. |
| 6,770,186 | B2 | 8/2004 | Rosenfeld et al. |
| 6,802,875 | B1 | 10/2004 | Kimbara et al. |
| 7,191,737 | B2 | 3/2007 | Klein |
| 7,273,044 | B2 | 9/2007 | Flessner et al. |
| 7,430,991 | B2 | 10/2008 | VanHoose et al. |
| 7,475,656 | B2 | 1/2009 | Yatsenko |
| 7,594,939 | B2 | 9/2009 | Goldstein et al. |
| 7,654,233 | B2 | 2/2010 | Lin |
| 8,100,092 | B2 | 1/2012 | McBride et al. |
| 8,163,142 | B1 | 4/2012 | Stama |
| 8,186,315 | B2 | 5/2012 | Jeffs et al. |
| 8,464,667 | B1 | 6/2013 | Stama |
| 8,561,578 | B2 | 10/2013 | Miyagawa et al. |
| 8,757,107 | B2 | 6/2014 | Owens |
| 8,869,755 | B2 | 10/2014 | Shmueli et al. |
| 9,051,872 | B2 | 6/2015 | Monros |
| 9,771,658 | B2 | 9/2017 | Haring |
| 9,771,859 | B2 | 9/2017 | Haring |
| 2004/0144579 | A1 | 7/2004 | Hasuka et al. |
| 2007/0080071 | A1 | 4/2007 | Perry |
| 2008/0025886 | A1 | 1/2008 | Manabe et al. |
| 2008/0047830 | A1 | 2/2008 | Fairfull et al. |
| 2008/0245318 | A1 | 10/2008 | Kuroki et al. |
| 2008/0302670 | A1 | 12/2008 | Boyle |
| 2009/0288947 | A1 | 11/2009 | Ostgaard |
| 2010/0049417 | A1 | 2/2010 | Bailey et al. |
| 2010/0089341 | A1 | 4/2010 | Richardson et al. |
| 2010/0180838 | A1 | 7/2010 | Lewis, III et al. |
| 2011/0212375 | A1 | 9/2011 | Taguchi et al. |
| 2011/0220039 | A1 | 9/2011 | Nowicki et al. |
| 2011/0253070 | A1 | 10/2011 | Haring |
| 2012/0067021 | A1 | 3/2012 | Aggelopoulos |
| 2012/0234265 | A1* | 9/2012 | Ball ........................ F02B 43/10 204/266 |
| 2014/0096728 | A1 | 4/2014 | Ortenheim et al. |
| 2014/0202401 | A1 | 7/2014 | Kuo |
| 2014/0216366 | A1 | 8/2014 | Monros |
| 2015/0040844 | A1* | 2/2015 | Goldman ............ F02D 19/0644 123/3 |
| 2017/0321335 | A1 | 11/2017 | Haring |
| 2017/0335760 | A1 | 11/2017 | Haring |
| 2018/0216543 | A1* | 8/2018 | Hoffmann ............... F02D 19/08 |
| 2021/0381427 | A1* | 12/2021 | Gaj-Jablonski ......... F02B 43/02 |

FOREIGN PATENT DOCUMENTS

| | | | |
|---|---|---|---|
| WO | WO2011129862 | A1 | 10/2011 |
| WO | WO2017069868 | A1 | 4/2017 |

* cited by examiner

ENHANCED CONTROL OF HYDROGEN INJECTION FOR INTERNAL COMBUSTION ENGINE SYSTEM AND METHOD

CROSS-REFERENCE TO RELATED APPLICATION

This invention comprises in part of improvements and additions to the inventions disclosed in U.S. Pat. No. 9,771,658, titled "Hydrogen Generation and Control for Internal-Combustion Vehicle," and U.S. Pat. No. 9,771,859, titled "Hydrogen Generator and Control for Internal-Combustion Vehicle," by Christopher Haring, the same inventor here, the full disclosures of which are incorporated by reference herein.

BACKGROUND OF THE INVENTION

This invention provides an enhanced control of hydrogen injection for internal combustion engine system and method providing greater real-time control of injection of hydrogen from a hydrogen generator, providing a further increase in performance and decrease in emissions of the engine of the motor vehicle.

Federal regulations require that automobile manufacturers improve fuel efficiency and emissions control. The addition of hydrogen gas and oxygen gas to the fuel system of an internal combustion engine is known to improve fuel efficiency and decrease the emission of undesired pollutants. These benefits are thought to be the result of more complete combustion induced by the presence of hydrogen and oxygen in the fuel-air mixture, as a consequence of which efficiency increases, while dangerous emissions such as soot, hydrocarbons, nitrogen oxides, and carbon oxides decrease.

The hydrogen and oxygen are generated through electrolysis and hydrolysis of a water solution, producing both hydrogen and oxygen gasses in the form of oxyhydrogen, also called brown gas or HHO, which is mixed with the fuel and the air supplied to the internal combustion engine. The operation and basic control of the hydrogen generator is disclosed in U.S. Pat. No. 9,771,658, titled "Hydrogen Generation and Control for Internal-Combustion Vehicle," and U.S. Pat. No. 9,771,859, titled "Hydrogen Generator and Control for Internal-Combustion Vehicle," by Christopher Haring, the same inventor here, and those disclosures are incorporated by reference here as additional disclosure regarding the operation and basic control of the hydrogen generator.

Further research, testing, experimentation, and development has shown that significant improvements to the basic operation and basic control of the hydrogen generator system can be made using enhanced control of hydrogen injection, sensing additional operational and ambient conditions, and making real-time adjustments to the injection of hydrogen appropriate for a specific engine under specific conditions.

SUMMARY OF THE INVENTION

This invention provides an enhanced control of hydrogen injection for internal combustion engine system and method providing greater real-time control of injection of hydrogen from a hydrogen generator, providing a further increase in performance and decrease in emissions of the engine of the motor vehicle.

Initial values for parameters defining the optimal percentage amount or pressure of oxyhydrogen to be injected when the engine load is equal to one of several defined levels are entered and then interpolated to produce a curve specifying the amount of oxyhydrogen to be injected at any given engine-load level. Further adjustments to the load-related oxyhydrogen amounts are made for different engine operating temperatures in relation to different engine loads, and for different ambient air pressures related to altitude in relation to different engine loads. The initial values and adjusted values will be different for different engine types and sizes, different fuel types and grades, and other characteristics. The enhanced control of hydrogen injection for internal combustion engine system and method takes account of these engine-specific and operation-specific differences to provide an optimum amount of oxyhydrogen injection across a range of operating and ambient conditions.

The operating conditions of engine load, rotational speed, vacuum, and engine temperature, and the ambient conditions of ambient temperature and ambient air pressure related to altitude are monitored in real time by a controller unit, which makes adjustments to cause a hydrogen injector to inject the optimum amount of oxyhydrogen into the fuel intake manifold of the engine. The controller unit also controls the operation of the hydrogen generator to provide adequate supply of oxyhydrogen and to ensure safe operations.

BRIEF DESCRIPTION OF THE DRAWINGS

Reference will now be made to the drawings, wherein like parts are designated by like numerals, and wherein.

DETAILED DESCRIPTION OF THE INVENTION

Figure 1:
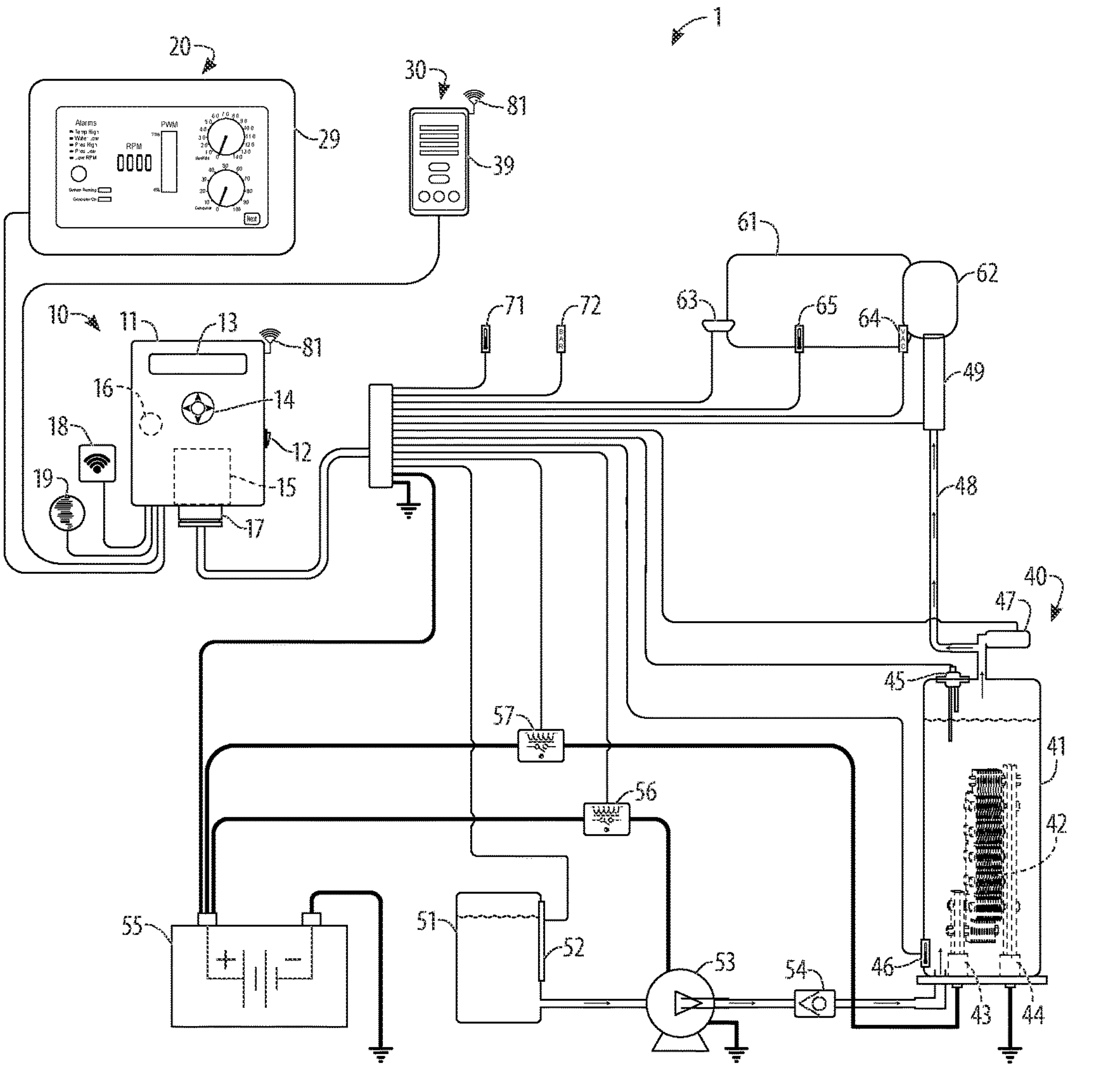
FIG. 1 is a schematic view of the enhanced control of hydrogen injection for internal combustion engine system and method of the invention.

Referring to FIG. 1, the enhanced control of hydrogen injection for internal combustion engine system and method 1 operates on an internal combustion engine 61 having a fuel intake manifold 62, injecting oxyhydrogen, also called HHO or brown gas, provided by a hydrogen generator 40, under the control of a controller unit 10. Operating parameters of the controller unit 10 can be set or adjusted using controller keys 14 located on the controller housing 11, using an in-cab graphic interface unit 20, or using a remote graphic interface unit 30, as treated in detail below.

The basic operation of the hydrogen generator 40 is treated briefly here, and is fully disclosed in the referenced U.S. Pat. Nos. 9,771,658 and 9,771,859. Within a pressure-sealed hydrogen generator housing 41 an electrolytic plate assembly 42 is submerged in a water-electrolyte solution. Electric current is supplied through a generator anode rod 43 and generator cathode rod 44, resulting in the electrolysis of liquid water into oxyhydrogen gas under pressure, which exits the hydrogen generator housing 41 through a hydrogen conduit 48 to a hydrogen injector 49 which injects the oxyhydrogen into the fuel intake manifold 62 of the engine 61 at a rate controlled in real time by the controller unit 10, as treated in detail below. A typical operating pressure within the hydrogen generator housing 41 is approximately 50 psi. The range of injection pressures by the hydrogen injector 49 is typically 35-to-50 psi. Electric current to drive the electrolysis is provided by a source such as the vehicle's battery 55, and is controlled in real time by the controller unit 10 connected through a controller wiring harness 17 to an electric current relay 57 which can stop or increase or decrease the rate of the electrolysis.

Figure 2:
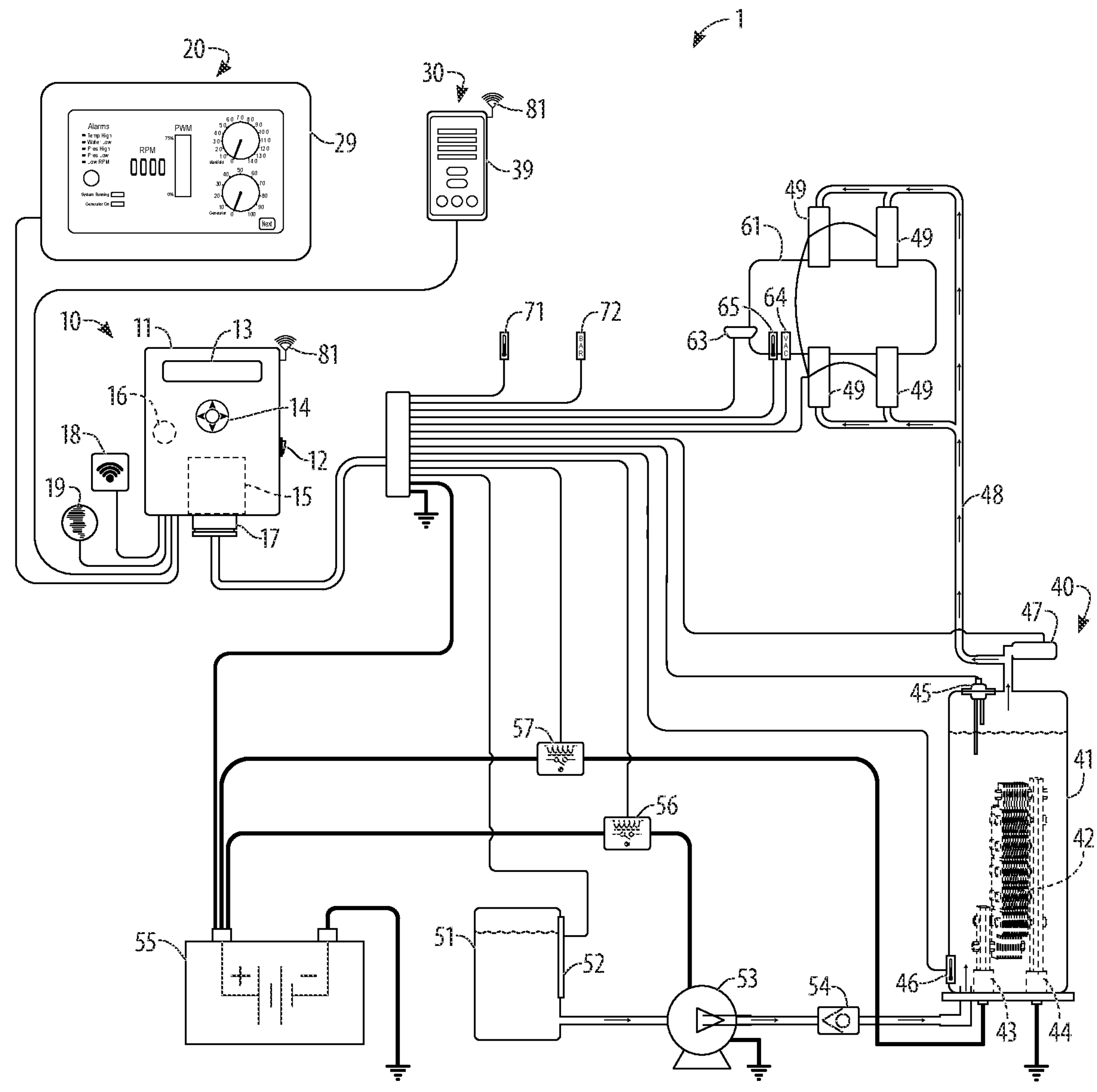
FIG. 2 is a schematic view of an embodiment of the enhanced control of hydrogen injection for internal combustion engine system and method of the invention providing multiple hydrogen injectors.

Referring briefly to FIG. 2, where an internal combustion engine does not take fuel from a fuel manifold, but from injection into multiple separate ports, the hydrogen injector 49 can be configured as multiple separate injectors having the same operational principles as the single hydrogen injector 49 provided for engines having a fuel manifold, as disclosed in detail in the referenced U.S. Pat. Nos. 9,771,658 and 9,771,859.

The electrolysis process consumes some of the liquid water lowering the water level within the generator housing 41. In preferred embodiments the electrolyte is not consumed but remains in the water at a higher concentration. A generator water level sensor 45 senses a pre-defined low water level and high water level and reports those levels through the controller wiring harness 17 to the controller unit 10. A water reservoir 51 provides water to refill the hydrogen generator 40. The consumption of liquid water in producing oxyhydrogen gas is such that approximately one gallon or 4 liters of liquid water is sufficient to produce HHO to operate a very large vehicle running hard under load for about three or four days. Therefore, in normal circumstances the water reservoir 51 is not required to have an extremely large capacity. A reservoir water level sensor 52 is provided to report water-level data to the controller unit 10 through the controller wiring harness 17. The water level in the water reservoir 51 is tracked and reported by the controller unit 10. If the water level falls below a warning threshold the controller unit 10 will issue a warning. If the water level falls below a danger threshold the controller unit 10 will shut down the electrolysis operation. A water pump 53 capable of overcoming the normal operating pressure within the hydrogen generator housing 41 transfers water from the water reservoir 51 into the hydrogen generator housing 41. A check valve 54 prevents a backward flow of the water. The water pump 53 is operated through a water pump relay 56 under the control of the controller unit 10, through the controller wiring harness 17. In operation, when the controller unit 10 detects a low-water condition through the generator water level sensor 45 the controller unit 10 through the water pump relay 56 causes the water pump 53 to pump water from the water reservoir 51 into the hydrogen generator housing 41. When the controller unit 10 detects a high-water condition through the generator water level sensor 45 the controller unit 10 through the water pump relay 56 causes the water pump 53 to stop pumping water.

A generator temperature sensor 46 reports the temperature within the hydrogen generator housing 41 through the controller wiring harness 17 to the controller unit 10. The electrolysis process generates heat, and the rate of the process is influenced by temperature. As a safety measure when the controller unit 10 detects a temperature above a safe-operation threshold the controller unit 10 will stop or slow the electrolysis process by cutting or reducing electric current through the electric current relay 57 until a lower temperature is achieved. If the controller unit 10 detects a temperature too low to allow efficient electrolysis, the controller unit 10 can temporarily increase the electric current to better drive the electrolysis process which in turn will generate more heat.

A generator gas pressure sensor 47 reports the gas pressure within the hydrogen generator housing 41 through the controller wiring harness 17 to the controller unit 10. When the gas pressure reaches a set point at or slightly above the desired operating pressure, typically 50 psi, the controller unit 10 will stop or slow the electrolysis process by cutting or reducing electric current through the electric current relay 57 until the pressure drops to a set point at or below the desired operating pressure.

A hydrogen conduit 48 conveys oxyhydrogen gas at the operating pressure from the hydrogen generator housing 41 to the hydrogen injector 49 which provides a controlled metered delivery rate of oxyhydrogen into the fuel-air mixture within the fuel intake manifold 62, or into the analogous structure or structures where a single intake manifold is not used. Under the control of the controller unit 10, the hydrogen injector 49 can inject the oxyhydrogen at the full operating pressure, normally 50 psi, or at a reduced pressure or reduced effective pressure. The pressure can be reduced by providing a device such as a linear micro ball valve with a stepper servo, or can be effectively reduced using a modulated pulsing at full pressure, which is called pulse-width modulation (PWM) herein. The linear micro ball valve has advantages in providing smoother adjustment using less energy to move and hold the more slowly moving valve than the constant high-speed movements required for pulsed modulation. As treated in detail herein the controller unit 10 adjusts the metered delivery rate of oxyhydrogen, in real-time, based on operational and ambient conditions, on characteristics of the particular engine used, and on adjustment parameters.

For a given engine the optimum amount or rate of oxyhydrogen injection under different engine load conditions and other conditions can be determined through testing and experimentation, including prior testing performed on representative engines of the same type, size, and fuel type. The optimum amounts for a specific engine can be further refined through analysis of operational data logged and reported by the controller unit 10. As treated in detail herein, the target optimum amount or rate of oxyhydrogen at several increasing engine-load values can be entered or uploaded to the controller unit 10 as parameters, and target optimum amounts at intermediate engine loads can be interpolated, yielding and generating a target-rate curve from which the target optimum amount or rate of oxyhydrogen at any given engine load can be determined. As treated below, the target-rate curve can further be adjusted with reference to engine temperature and ambient air pressure related to altitude.

Figure 3:
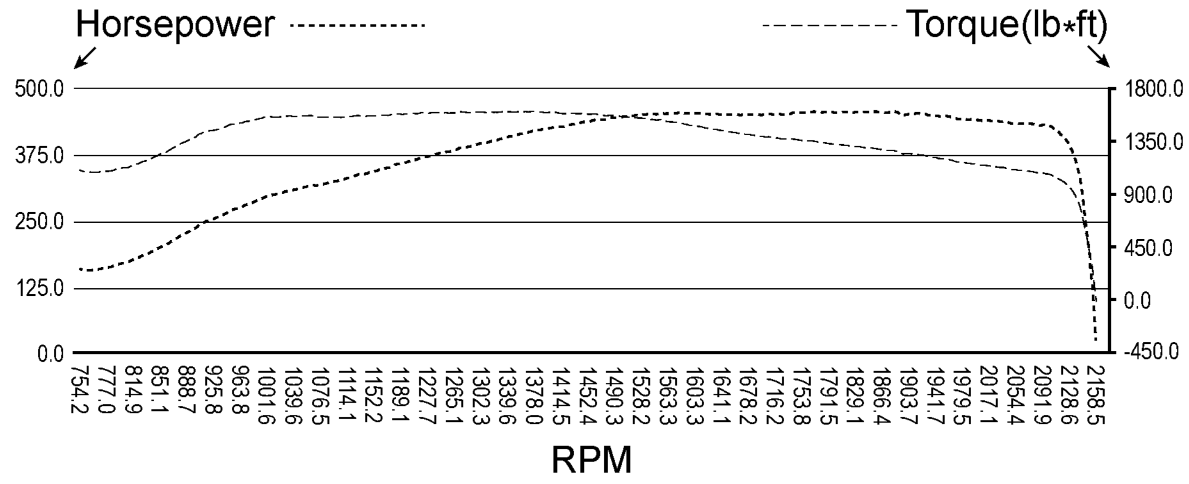
FIG. 3 is a graph of the results of testing of a representative internal combustion engine presented in horsepower and torque in foot-pounds over a range of RPM rotational speeds.
Figure 4:
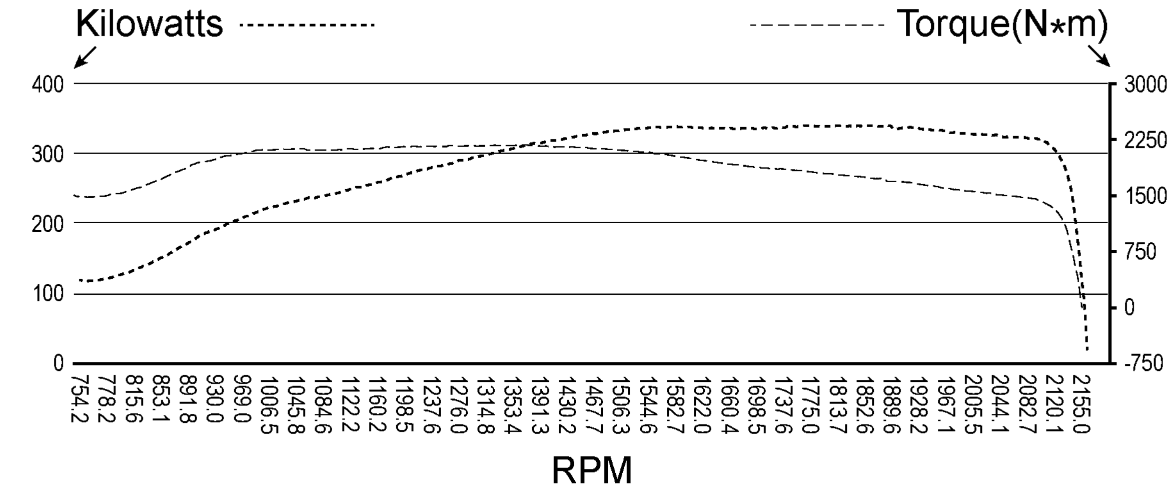
FIG. 4 is a graph of the results of testing of a representative internal combustion engine presented in Kilowatts and torque in newton-meters over a range of RPM rotational speeds.

Different sizes, configurations, and designs of internal combustion engines, and sometimes even individual engines of an otherwise uniform design, exhibit different characteristics in producing power and torque, rate of fuel use, efficiency of combustion, and exhaust emissions. And any given engine exhibits different characteristics under different conditions of load, rotational speed, engine operating temperature, ambient temperature, pressure, and humidity. Also, the performance of any given engine changes in relation to changes in the operating temperature, rotational speed, and load. Referring briefly to FIG. 3 & FIG. 4, graphing the results of a single series of tests presented in two different units of power and two different measurements of torque, the power and torque output of an internal combustion engine was measured through a range of rotational speeds from 754 RPM through 2158 RPM, at a barometric pressure of 29.9 inHg, ambient temperature of 80 °F, and relative humidity of 44%. Broadly stated, the testing showed that power output rises significantly with increasing rotational speed while torque remains more steady through moderate speeds and decreases at higher speeds. A different series of extensive testing of fuel usage, efficiency, and emissions of hydrocarbons, nitrogen oxides, and carbon oxides showed variations due to different ambient conditions and operating conditions. These tests were performed on unmodified engines and on engines having oxyhydrogen (HHO) injected in varying amounts. It was shown that varying the amount of HHO injected, in real time during operation, according to the ambient conditions and operating conditions can improve on the basic benefits of the HHO injection, including improvements in fuel efficiency from more complete combustion producing fewer harmful emissions.

Injection of oxyhydrogen in a moderate fixed amount can improve the operation of most internal combustion engines under most conditions. Testing and experimentation has shown that different engines, of different types, using different fuels, in different types of vehicles, show different levels of improvement when receiving a given fixed amount of oxyhydrogen. Also, for any given engine, a fixed amount of oxyhydrogen shows different levels of improvement when that engine is operated at different rotational speeds and engine temperatures, under different loads, and under different ambient conditions of temperature and altitude-related air pressures. A given fixed amount of oxyhydrogen might provide the maximum benefit to a certain engine operating at a certain speed under a certain load and under certain ambient conditions, where no improvement could be made in fuel efficiency, complete combustion, reduction of emissions, and other measures. But then when that same certain engine is operated at a different speed under a different load and conditions, the same fixed amount of oxyhydrogen might no longer be optimal to achieve the maximum improvements which might be achieved by adjusting the amount of oxyhydrogen injected when that engine is operating under those conditions. The enhanced control of hydrogen injection for internal combustion engine system and method 1 provides for the setting and adjusting of parameters defining the optimum amount of oxyhydrogen to be injected for the specific engine operating under several conditions, provides for real-time monitoring of the relevant conditions, and provides for real-time increases or decreases of the amount of oxyhydrogen injected appropriate to changed conditions. The enhanced control of hydrogen injection for internal combustion engine system 1 also provides for safe operation through monitoring, early detection of unsafe or potentially unsafe conditions, stopping or altering operation as appropriate, and displaying, logging, and reporting such operating conditions.

Referring again to FIG. 1, through the ECU-CAN-OBD interface 63 the controller unit 10 receives data, including real-time data, from the Engine Control Unit (ECU) through a standard method such as the Controller Area Network (CAN) bus or through an On-board Diagnostics (OBD) system which provides, for example, an OBD-II diagnostic connector. Relevant data might be provided directly or might be derived from provided data. The ECU-CAN-OBD interface 63 can directly sense whether an engine is running, which is an important consideration for safe operation of the system. Operation of the hydrogen generator 40 should be stopped and should not be started if the engine is not running. The rotational speed in RPM is provided by reading a crankshaft position sensor. The level of load on the engine 61 is either calculated and reported by the engine's ECU, or can be calculated by the controller unit 10 from data reported by the ECU.

From an engine vacuum sensor 64 the controller unit 10 receives real-time data about the pressure at the fuel intake manifold 62. The engine vacuum sensor 64 can be implemented in different ways. A vacuum line can be run from the engine to the controller housing 11 and the vacuum can be determined by a pressure sensor within the controller housing 11. A pressure sensor can be fitted to the engine 61 and can convey data to the controller unit 10 over a wire within the controller wiring harness 17, as illustrated. Or the data from the intake manifold pressure sensor or manifold absolute pressure (MAP) sensor of the engine's ECU can be conveyed through the ECU-CAN-OBD interface 63.

From an engine temperature sensor 65 the controller unit 10 receives real-time data about the operating temperature of the engine 61. The engine temperature sensor 65 can be implemented by a temperature sensor fitted to the engine 61, conveying data to the controller unit 10 over a wire within the controller wiring harness 17, as illustrated, or temperature data from the engine's ECU can be conveyed through the ECU-CAN-OBD interface 63.

From an ambient temperature sensor 71 the controller unit 10 receives real-time data about the ambient air temperature. The ambient temperature sensor 71 can be implemented by a temperature sensor located such that the heat of the engine itself does not skew the measurements, conveying data to the controller unit 10 over a wire within the controller harness 17, as illustrated. For some engines it might also be appropriate to use intake air temperature data from the engine's ECU as the ambient air temperature, either directly or with an appropriate correction factor.

From an ambient pressure sensor 72 the controller unit 10 receives real-time data about the ambient air pressure, conveyed over a wire within the controller harness 17, as illustrated. In operation the ambient pressure will be most strongly influenced by altitude, and less strongly influenced by weather conditions. Therefore, the ambient pressure sensor 72 functions primarily as a pressure altimeter, and ambient-pressure adjustment parameters can be understood and manipulated in terms of altitude ranges.

The controller unit 10 provides a controller housing 11 having a controller main switch 12. A controller display 13 and controller keys 14 provide a basic user interface with the controller unit 10. A controller system board 15 within the controller housing 11 provides the electronic circuitry for sensing and storing data, for processing the data, and for sending appropriate control signals, using components and techniques known in the art. A controller battery 16 provides a source of backup power for the controller system board 15. A controller wiring harness 17 organizes the wiring connecting sensors and relays as described herein. Optionally, a controller wireless interface 18 can be provided to enable wireless communications to and from the controller unit 10 over a secure standard protocol such as WIFI or BLUETOOTH. Such wireless communication could be used, for example, to communicate with sensors located too remotely for convenient wiring, or to upload or download data to and from the controller unit 10. Optionally, a controller internet interface 19 can be provided to enable secure access to the controller unit 10 through, for example, a standard internet or web browser.

The enhanced control of hydrogen injection for internal combustion engine system and method 1 provides a controller unit 10 having an RF communication unit 81. In a preferred embodiment the RF communication unit 81 is implemented as a cellular telephone network data link. The RF communication unit 81 in the controller unit 10 allows remote access to the enhanced control of hydrogen injection for internal combustion engine system 1 even when the vehicle is in operation and moving. The RF communication unit 81 in the controller unit 10 provides, for example, for downloading of operation data, real-time remote notification of warning or alert conditions, or uploading of new information or parameters. The RF communication unit 81 in the controller unit 10 also provides for communication with the remote graphic interface unit 30, as treated in detail below.

The enhanced control of hydrogen injection for internal combustion engine system 1 provides an in-cab graphic interface unit 20 and a remote graphic interface unit 30, each providing for real-time display of operating status, conditions, and settings, and providing for real-time input and adjustment of settings of operating parameters, as treated in detail below. The in-cab graphic interface unit 20 provides an in-cab display unit 29 which in a preferred embodiment is a touch-screen display such as, for example, a thin-film transistor (TFT) liquid-crystal display (LCD). The remote graphic interface unit 30 provides a remote display unit 39 which in a preferred embodiment is implemented on a smartphone or tablet device having a cellular telephone network data link. The remote display unit 39 provides an RF communication unit 81 for communication with the corresponding RF communication unit 81 of the controller unit 10. In a preferred embodiment, the RF communication unit 81 is the cellular telephone network data link built into the smartphone or tablet device. The controller unit 10 optionally also provides a wired link to the remote graphic interface unit 30 such as a standard Universal Serial Bus (USB) link which can be used for data transfer and for powering the remote display unit 39.

The in-cab graphic interface unit 20 and the remote graphic interface unit 30 provide multiple interface pages for optimal real-time display of operating and performance information, for optimal display and adjustment of parameters which can safely and appropriately be adjusted during operation, and for optimal display and adjustment of parameters which should not need to be adjusted during operation. As examples, the illustrated embodiment shows five in-cab interface pages and five remote interface pages. The exact number and exact layout of the pages is of less importance than the display of the information in an understandable format and the ability to make adjustments easily, intuitively, and safely. In the illustrated embodiments of the pages the amount of oxyhydrogen released through the hydrogen injector 49 is expressed in percentages of pulse-width modulation (PWM) or modulated pulsing at full pressure. For embodiments using a linear micro ball valve instead of PWM, appropriate changes to the labeling of the display can be easily made. The amount of oxyhydrogen can also be expressed in units such as liters per minute.

In use, initial parameter settings for a newly installed system might be downloaded or otherwise obtained for the appropriate model, make, or type of engine, the vehicle or type of vehicle, the fuel type, and the anticipated operating conditions. During continued use the parameter settings might be adjusted based on the system's own logged and reported data, or based on testing, experimentation, or observation.

Figure 5:
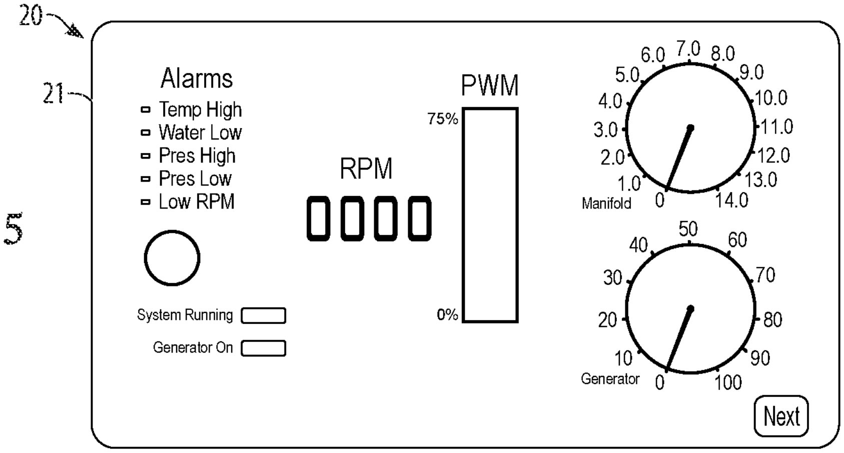
FIG. 5 is a representation of the in-cab interface page one of the in-cab graphic interface unit of the enhanced control of hydrogen injection for internal combustion engine system and method of the invention.

Referring to FIG. 5, in-cab interface page one 21 displays an overview of the real-time operating conditions of the enhanced control of hydrogen injection for internal combustion engine system 1.

Figure 6:
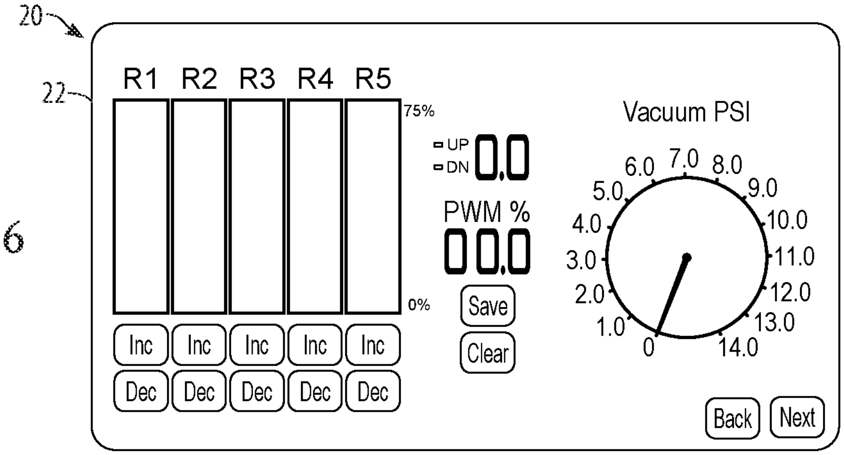
FIG. 6 is a representation of the in-cab interface page two of the in-cab graphic interface unit of the enhanced control of hydrogen injection for internal combustion engine system and method of the invention.

Referring to FIG. 6, in-cab interface page two 22 provides for setting or changing the definitions of the starting points of five ranges of engine load, R1 through R5, with the engine load being measured in relation to vacuum pressure.

Figure 7:
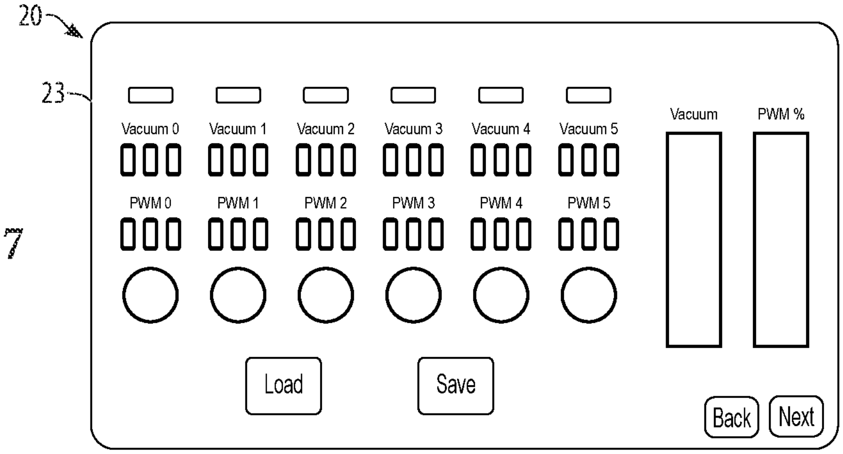
FIG. 7 is a representation of the in-cab interface page three of the in-cab graphic interface unit of the enhanced control of hydrogen injection for internal combustion engine system and method of the invention.

Referring to FIG. 7, in-cab interface page three 23 provides for setting or changing the percentage amount or pressure of oxyhydrogen to be injected when the engine vacuum is equal to one of six defined levels. In use the controller unit 10 will interpolate intermediate percentages of oxyhydrogen for intermediate vacuum levels. The percentage amounts defined on this page and the interpolated intermediate amounts will be referred to as the load-related amount of oxyhydrogen. This load-related amount of oxyhydrogen serves as an initial calculation of the target-rate curve.

Figure 8:
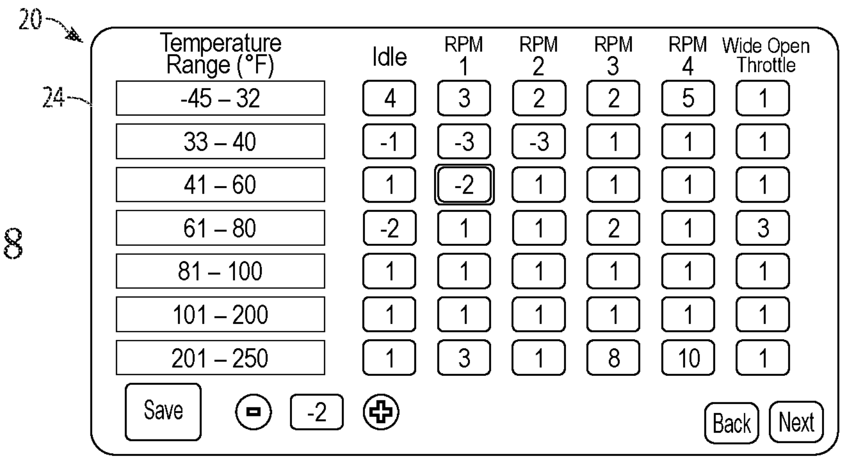
FIG. 8 is a representation of the in-cab interface page four of the in-cab graphic interface unit of the enhanced control of hydrogen injection for internal combustion engine system and method of the invention.

Referring to FIG. 8, in-cab interface page four 24 provides for setting or changing engine temperature adjustment values associated with different ranges of temperatures and with increasing amounts of engine load from engine idle through intermediate loads to wide open throttle. The adjustment values represent percentages by which the load-related amount of oxyhydrogen will be increased or decreased when the engine is operating in that temperature range at that load. Application of such adjustment modifies the target-rate curve. An adjustment value of 1 represents no change. An adjustment value of 3 represents a 3% increase, and −2 represents a 2% decrease, for example. In use the controller unit 10 will interpolate intermediate adjustment values for intermediate engine loads. On the touch screen, the user selects the cell at the intersection of the target temperature range and the target engine load. With the target cell selected, the user can increase or decrease the adjustment value using the plus or minus buttons. When the adjustment values have been entered or changed, the parameters can be saved to the controller unit 10 using the provided button.

Figure 9:
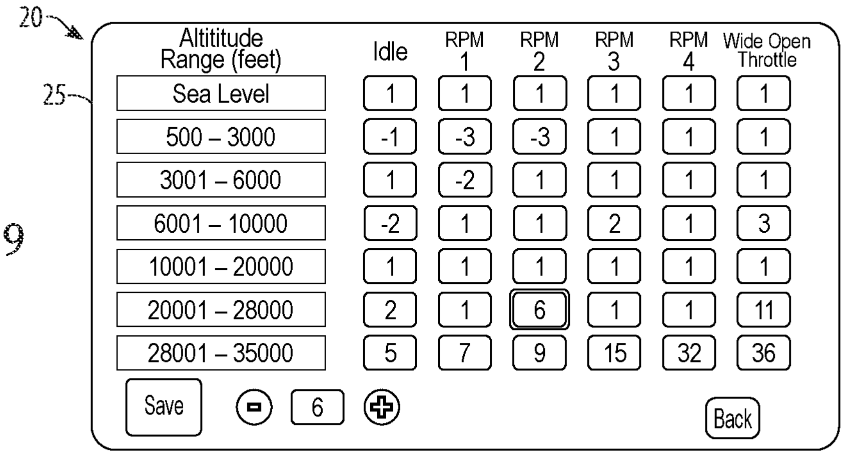
FIG. 9 is a representation of the in-cab interface page five of the in-cab graphic interface unit of the enhanced control of hydrogen injection for internal combustion engine system and method of the invention.

Referring to FIG. 9, in-cab interface page five 25 provides for setting or changing engine altitude adjustment values associated with different ambient pressures corresponding to different ranges of altitudes and with increasing amounts of engine load from engine idle through intermediate loads to wide open throttle. The adjustment values represent percentages by which the load-related amount of oxyhydrogen will be increased or decreased when the engine is operating in that altitude range at that load. An adjustment value of 1 represents no change. Application of such adjustment modifies the target-rate curve. An adjustment value of 6 represents a 6% increase, and −2 represents a 2% decrease, for example. In use the controller unit 10 will interpolate intermediate adjustment values for intermediate engine loads. On the touch screen, the user selects the cell at the intersection of the target temperature range and the target engine load. With the target cell selected, the user can increase or decrease the adjustment value using the plus or minus buttons. When the adjustment values have been entered or changed, the parameters can be saved to the controller unit 10 using the provided button.

For safety reasons the changing of most parameter values via the in-cab graphic interface unit 20 will be limited to entry of reasonable and safe values at all times, and the changing of some parameter values in real time during operation of the vehicle will be further limited or restricted. Even an allowed change in real time during operation might be implemented more gradually in order to further ensure safety.

Figure 10:
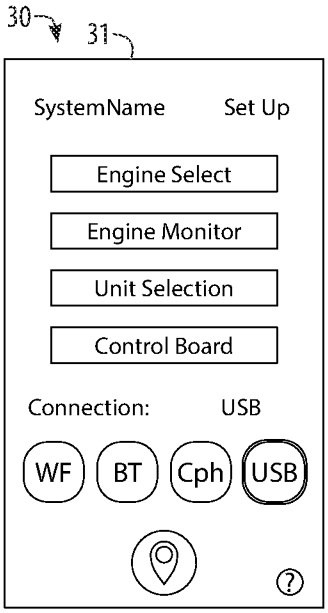
FIG. 10 is a representation of the remote interface page one of the remote graphic interface unit of the enhanced control of hydrogen injection for internal combustion engine system and method of the invention.

Referring to FIG. 10, remote interface page one 31 provides for setting or changing the identification of the specific engine and controller unit 10 being controlled, and establishing a secure connection, where the remote graphic interface unit 30 will have remote access to the system, and a secure connection is necessary.

Figure 11:
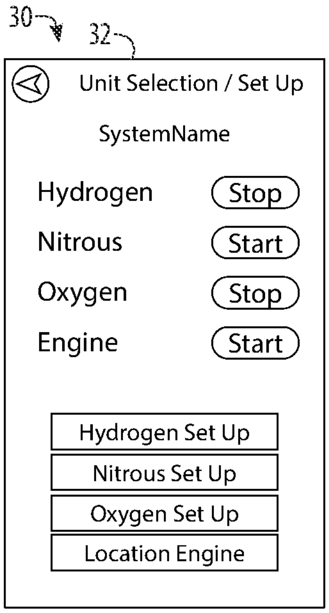
FIG. 11 is a representation of the remote interface page two of the remote graphic interface unit of the enhanced control of hydrogen injection for internal combustion engine system and method of the invention.

Referring to FIG. 11, remote interface page two 32 provides for starting and stopping operation of the enhanced control of hydrogen injection for internal combustion engine system. Also provided is a link for viewing and optionally changing the load-related amounts of oxyhydrogen at several load levels. The remote graphic interface unit 30 obtains and updates the load-related amount values from the controller unit 10 remotely through the RF communication units 81 or locally through a wired connection, or through the optional controller wireless interface 18. The illustrated embodiment of the remote interface page two 32 also provides for control of nitrous oxide and oxygen systems, and for remote engine starting and stopping, outside the scope of the enhanced control of hydrogen injection for internal combustion engine system and method 1.

Figure 12:
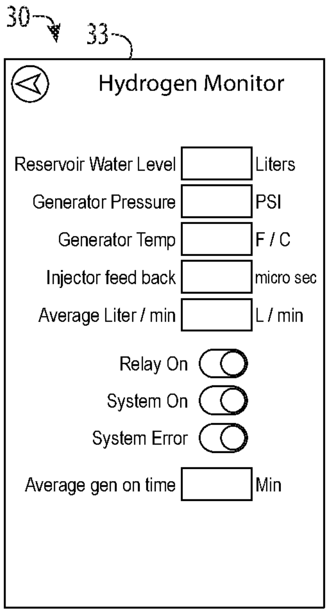
FIG. 12 is a representation of the remote interface page three of the remote graphic interface unit of the enhanced control of hydrogen injection for internal combustion engine system and method of the invention.

Referring to FIG. 12, remote interface page three 33 provides for real-time display of operating data from the controller unit 10, including on-off status indicators for the electric current relay 57 and for the overall system, and an error-condition indicator.

Figure 13:
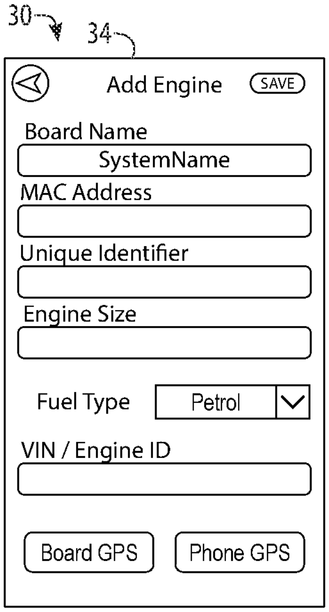
FIG. 13 is a representation of the remote interface page four of the remote graphic interface unit of the enhanced control of hydrogen injection for internal combustion engine system and method of the invention.

Referring to FIG. 13, remote interface page four 34 provides for initial entry of information about an engine, and for subsequent display of the information.

Figure 14:
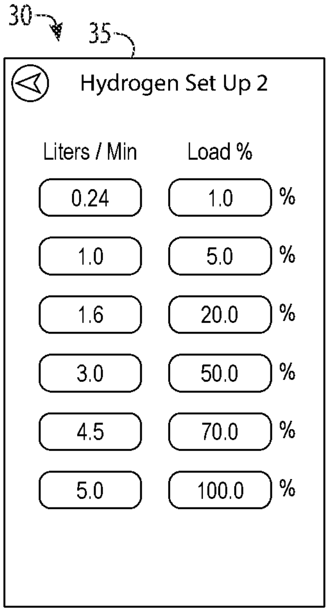
FIG. 14 is a representation of the remote interface page five of the remote graphic interface unit of the enhanced control of hydrogen injection for internal combustion engine system and method of the invention.

Referring to FIG. 14, remote interface page five 35 provides for real-time display of the currently set values for the load-related amount of oxyhydrogen parameters. Optionally, the page can also provide for changing of the set values, if such changes can be made safely. For safety reasons the ability to start or stop operations and to change parameter values in real time for a running engine through the remote graphic interface unit 30 should be restricted to circumstances where the remote display unit 39 is known to be inside or near to the vehicle, such as when the unit is communicating over a wire.

Many other changes and modifications can be made in the system and method of the present invention without departing from the spirit thereof. I therefore pray that my rights to the present invention be limited only by the scope of the appended claims.

I claim:

1. An enhanced control of hydrogen injection system for use on an internal combustion engine of a vehicle, the enhanced control of hydrogen injection system comprising:

(i) a hydrogen generator having a generator water level sensor, a generator temperature sensor, and a generator gas pressure sensor, adapted to generate oxyhydrogen gas by controlled electrolysis of water;

(ii) a hydrogen injector adapted to inject oxyhydrogen gas from said hydrogen generator into a fuel intake manifold of the engine at an adjustable metered delivery rate;

(iii) an ECU-OBD-CAN interface;

(iv) an engine vacuum sensor;

(v) an engine temperature sensor;

(vi) an ambient temperature sensor;

(vii) an ambient pressure sensor;

(viii) a controller unit having a controller housing, controller main switch, controller display, controller keys, controller system board, controller battery, and controller wiring harness, adapted to control operations of said hydrogen generator and said hydrogen injector in real time according to a target-rate curve;

(ix) an in-cab graphic interface unit; and (x) a remote graphic interface unit.

2. The enhanced control of hydrogen injection system of claim 1, further comprising a hydrogen conduit adapted to convey generated oxyhydrogen gas from said hydrogen generator to said hydrogen injector.

3. The enhanced control of hydrogen injection system of claim 1, where said hydrogen injector further comprises multiple said hydrogen injectors.

4. The enhanced control of hydrogen injection system of claim 1, where said in-cab graphic interface unit further comprises an in-cab display unit having multiple in-cab interface pages.

5. The enhanced control of hydrogen injection system of claim 1, where said remote graphic interface unit further comprises a remote display unit having multiple remote interface pages.

6. The enhanced control of hydrogen injection system of claim 1, where said controller unit further comprises an RF communication unit.

7. The enhanced control of hydrogen injection system of claim 1, where said remote graphic interface unit further comprises an RF communication unit.

8. The enhanced control of hydrogen injection system of claim 1, where said hydrogen generator further comprises having a hydrogen generator housing, an electrolytic plate assembly, a generator anode rod, and a generator cathode rod.

9. The enhanced control of hydrogen injection system of claim 1, further comprising a water reservoir, a reservoir water level sensor, a water pump, and a check valve.

10. The enhanced control of hydrogen injection system of claim 1, further comprising a battery, a water pump relay, and an electric current relay.

11. The enhanced control of hydrogen injection system of claim 1, where said controller unit further comprises a controller wireless interface.

12. The enhanced control of hydrogen injection system of claim 1, where said controller unit further comprises a controller internet interface.

13. The enhanced control of hydrogen injection system of claim 1, where said controller unit further comprises a wired link to said remote graphic interface unit.

14. An enhanced control of hydrogen injection system for use on an internal combustion engine of a vehicle, the enhanced control of hydrogen injection system comprising:

(i) a hydrogen generator having a generator water level sensor, a generator temperature sensor, a generator gas pressure sensor, a hydrogen generator housing, an electrolytic plate assembly, a generator anode rod, and a generator cathode rod, adapted to generate oxyhydrogen gas by controlled electrolysis of water;

(ii) a hydrogen conduit;

(iii) a hydrogen injector adapted to inject oxyhydrogen gas from said hydrogen generator through said hydrogen conduit into a fuel intake manifold of the engine at an adjustable metered delivery rate;

(iv) an ECU-OBD-CAN interface;

(v) an engine vacuum sensor;

(vi) an engine temperature sensor;

(vii) an ambient temperature sensor;

(viii) an ambient pressure sensor;

(ix) a controller unit having a controller housing, controller main switch, controller display, controller keys, controller system board, controller battery, controller wiring harness, and RF communication unit, adapted to control operations of said hydrogen generator and said hydrogen injector in real time according to a target-rate curve;

(x) an in-cab graphic interface unit having an in-cab display unit having multiple in-cab interface pages; and (xi) a remote graphic interface unit having an RF communication unit and a remote display unit having multiple remote interface pages.

15. The enhanced control of hydrogen injection system of claim 14, where said hydrogen injector further comprises multiple said hydrogen injectors.

16. The enhanced control of hydrogen injection system of claim 14, where said controller unit further comprises a controller wireless interface.

17. The enhanced control of hydrogen injection system of claim 14, where said controller unit further comprises a controller internet interface.

18. The enhanced control of hydrogen injection system of claim 14, where said controller unit further comprises a wired link to said remote graphic interface unit.

19. The enhanced control of hydrogen injection system of claim 14, further comprising a water reservoir, a reservoir water level sensor, a water pump, a check valve, a battery, a water pump relay, and an electric current relay.

20. A method of enhanced control of hydrogen injection for an internal combustion engine comprising:

(i) providing an enhanced control of hydrogen injection system comprising:

(a) a hydrogen generator having a generator water level sensor, a generator temperature sensor, and a generator gas pressure sensor, adapted to generate oxyhydrogen gas by controlled electrolysis of water;

(b) a hydrogen injector adapted to inject oxyhydrogen gas from said hydrogen generator into a fuel intake manifold of the engine at an adjustable metered delivery rate;

(c) a controller unit having a controller housing, controller main switch, controller display, controller keys, controller system board, controller battery, and controller wiring harness;

(d) an in-cab graphic interface unit; and (e) a remote graphic interface unit;

(ii) providing an ECU-OBD-CAN interface;

(iii) providing an engine vacuum sensor;

(iv) providing an engine temperature sensor;

(v) providing an ambient temperature sensor;

(vi) providing an ambient pressure sensor;

(vii) entering into said controller unit parameter values specifying target optimum amounts of oxyhydrogen at several engine-load values;

(viii) entering into said controller unit adjustment values specifying adjustments for engine temperature;

(ix) entering into said controller unit parameter values specifying adjustments for ambient air pressure related to altitude;

(x) generating a target-rate curve from said entered parameter values;

(xi) monitoring engine load, engine temperature, and ambient air pressure in real time during use; and (xii) controlling the amount of oxyhydrogen injected by said hydrogen injector, in real time, according to said target-rate curve.

* * * * *